US008619767B2

(12) United States Patent
Ohashi

(10) Patent No.: US 8,619,767 B2
(45) Date of Patent: Dec. 31, 2013

(54) COMMUNICATION TERMINAL AND COMMUNICATION SYSTEM

(75) Inventor: Masaoki Ohashi, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 837 days.

(21) Appl. No.: 11/733,481

(22) Filed: Apr. 10, 2007

(65) Prior Publication Data

US 2007/0250885 A1 Oct. 25, 2007

(30) Foreign Application Priority Data

Apr. 10, 2006 (JP) ................................. 2006-107401

(51) Int. Cl.
*H04L 12/56* (2011.01)

(52) U.S. Cl.
USPC ........ 370/389; 370/252; 370/395.21; 713/183

(58) Field of Classification Search
None
See application file for complete search history.

(56) References Cited

U.S. PATENT DOCUMENTS

| 7,653,383 | B2 * | 1/2010 | Natarajan | 455/419 |
| 2001/0054157 | A1 * | 12/2001 | Fukumoto | 713/201 |
| 2003/0005446 | A1 * | 1/2003 | Jaff et al. | 725/51 |
| 2006/0090074 | A1 * | 4/2006 | Matoba | 713/171 |
| 2006/0127037 | A1 * | 6/2006 | Van Hoff et al. | 386/83 |

FOREIGN PATENT DOCUMENTS

| JP | 2001-51948 | 2/2001 |
| JP | 2004-320197 | 11/2004 |
| JP | 2005-110205 | 4/2005 |
| JP | 2006-050114 | 2/2006 |

* cited by examiner

*Primary Examiner* — Kibrom T Hailu
*Assistant Examiner* — Zewdu A Beyen
(74) *Attorney, Agent, or Firm* — Oblon, Spivak, McClelland, Maier & Neustadt, L.L.P.

(57) ABSTRACT

A communication terminal of the present invention includes a first communication unit used for communication including at least a voice call, an operation input unit for acquiring instruction input from a user, a second communication unit for performing communication with a predetermined object apparatus equipped with a function capable of receiving access via at least an external network, and a control unit that, when a voice call channel is established to another communication terminal, and an access permission instruction is inputted by the user, performs setting with respect to the object apparatus to permit the access from the another communication terminal via the external network, and transmits, to the another communication terminal, access information for performing the access to the object apparatus via the external network.

18 Claims, 5 Drawing Sheets

COMMUNICATION TERMINAL AND COMMUNICATION SYSTEM

BACKGROUND OF THE INVENTION

1. Field of the Invention

The present invention relates to a communication terminal and a communication system preferable for controlling various apparatuses within a home network connectable to an external network such as, e.g., the internet, externally through the internet or the like.

2. Background of the Invention

Conventionally, in the case where an external apparatus accesses various apparatuses within a home network connected to the internet through the internet or the like, at least an access right to a router and setting for the external apparatus to connect to the home network have been required. Accordingly, it is very difficult for an apparatus other than a predetermined communication terminal in which the access right is set in advance to be externally connected to the home network.

On the other hand, International Publication WO 01/82086 (Patent Document 1) discloses a system including an access right setting device and a manager terminal capable of easily setting an access right by a request of a user who is restricted in access to a resource of a network. According to this system, the user who desires to access the resource on the network describes setting contents of the access right such as the resource, time and access contents in access request information, and transmits it to the access right setting device managing the access right. The access request information is transferred to a manager of the resource by access-request information transferring means, and if the relevant manager confirms the request contents and determines acceptance, the access right is automatically set by the access right setting device.

Moreover, Japanese Patent Application Publication No. 2003-242115 (Patent Document 2) discloses an HTTP authentication method enabling easy authentication work and improvement of security without cumbersome operation of a client. According to this HTTP authentication method, in the case where a personal computer or a VTR is operated remotely using a mobile telephone terminal owned by a user having access authentication, a server device is first dialed. Upon receiving this, a URL managing unit creates a disposable password with an expiring date, and notifies an SMTP client of the same. The SMTP client creates an electronic mail in which a URL with the password embedded is described and transmits it to the mobile telephone terminal. The mobile telephone terminal specifies the relevant URL to access an HTTP sever, and the HTTP sever performs authentication work with reference to the password embedded in the URL, and transmits HTML data or remotely operates the in-house apparatus.

[Patent Document 1] International Publication WO. 01/82086 (FIGS. 1, 2)

[Patent Document 2] Japanese Patent Application Publication No. 2003-242115 (FIGS. 1, 2, 5)

SUMMARY OF THE INVENTION

In an actual daily life scene, e.g. when a user is inquiring at a customer center or the like about setting of a personal computer at home or the like, or e.g. when a father or mother having trouble in operation or setting of a video recording apparatus asks his or her son or the like for a video recording method over the phone, and so on, there are many cases where a person having an ability to perform setting of an object apparatus desires to directly operate or set the object apparatus externally via a network.

However, as described before, in order for the external terminal to perform the setting or the like of the object apparatus via the network, the access right to the object apparatus needs to be in advance granted to the relevant external terminal, or the user of the object apparatus needs to set the access right for the external terminal on the spot. However, it is not preferable on security that the access right be in advance granted to the external terminal, and also, it is considered to be difficult that the user unaccustomed to the setting or operation of the apparatus performs the operation such as setting the access right for the external terminal or the like on the spot.

According to the above-described International Publication WO. 01/82086 or Japanese Patent Application Publication No. 2003-242115, while the setting of the access right with respect to the external terminal or the like can be performed, authentication processing of the external terminal requesting the access right, and its configuration are complex and large-scaled, thus causing a great increase in cost.

Thus, according to an embodiment of the present invention, there is provided a communication terminal and a communication system enabling setting of an access right to an object apparatus for an external terminal via a network while assuring security performance without requiring complex operation for access right setting of the object apparatus and security setting or the like, and without using a large-scaled and complex system.

A communication terminal of the present invention includes a first communication unit used for communication including at least a voice call, an operation input unit for acquiring instruction input from a user, a second communication unit for performing communication with a predetermined object apparatus equipped with a function capable of receiving access via at least an external network, and a control unit that, when a voice call channel is established to another communication terminal, and an access permission instruction is inputted by the user, performs setting with respect to the object apparatus to permit the access from the another communication terminal via the external network, and transmits, to the another communication terminal, access information for performing the access to the object apparatus via the external network.

Moreover, a communication terminal of the present invention includes a communication unit used for communication including at least a voice call, an operation input unit for acquiring instruction from a user, and a control unit that performs control so as to access a predetermined object apparatus via an external network utilizing predetermined access information transmitted from another communication terminal after a voice call channel is established to the another communication terminal.

Furthermore, a communication system of the present invention includes a first communication terminal that, when a voice call channel is established to a second communication terminal, and an access permission instruction is inputted by a user, performs setting to permit access from the second communication terminal to a predetermined object apparatus via an external network, and further transmits, to the second communication terminal, access information for accessing the object apparatus via the external network, and the second communication terminal that accesses the object apparatus via the external network utilizing the access information transmitted from the first communication terminal after the voice call channel is established to the first communication terminal.

That is, according to an embodiment of the present invention, by the establishment of the voice call channel between the communication terminals, the counterpart of each other is specified, and further one of the communication terminals performs the setting only with respect to the specified counterpart communication terminal to permit the access via the external network to the object apparatus to which the above-mentioned one of the terminals has the access right, and further supplies, to the counterpart communication terminal, the information for accessing the object apparatus via the external network.

In the present invention, when the voice call channel is mutually established, and the access permission instruction is inputted by the user, the one of the communication terminals performs the setting with respect to the object apparatus to permit the access from the other communication terminal via the external network, and further, transmits, to the counterpart communication terminal, the access information for accessing the object apparatus via the external network, by which the user does not need to perform complex operation for the access right setting of the object apparatus, security setting and the like, and can set the access right of the object apparatus in the counterpart communication terminal via the network while assuring security performance without using a large-scaled and complex system.

BRIEF DESCRIPTION OF THE DRAWINGS

The present invention will become more readily appreciated and understood from the following detailed description of embodiments and examples of the present invention when taken in conjunction with the accompanying drawings, in which.

DESCRIPTION OF THE PREFERRED EMBODIMENT

Figure 1:
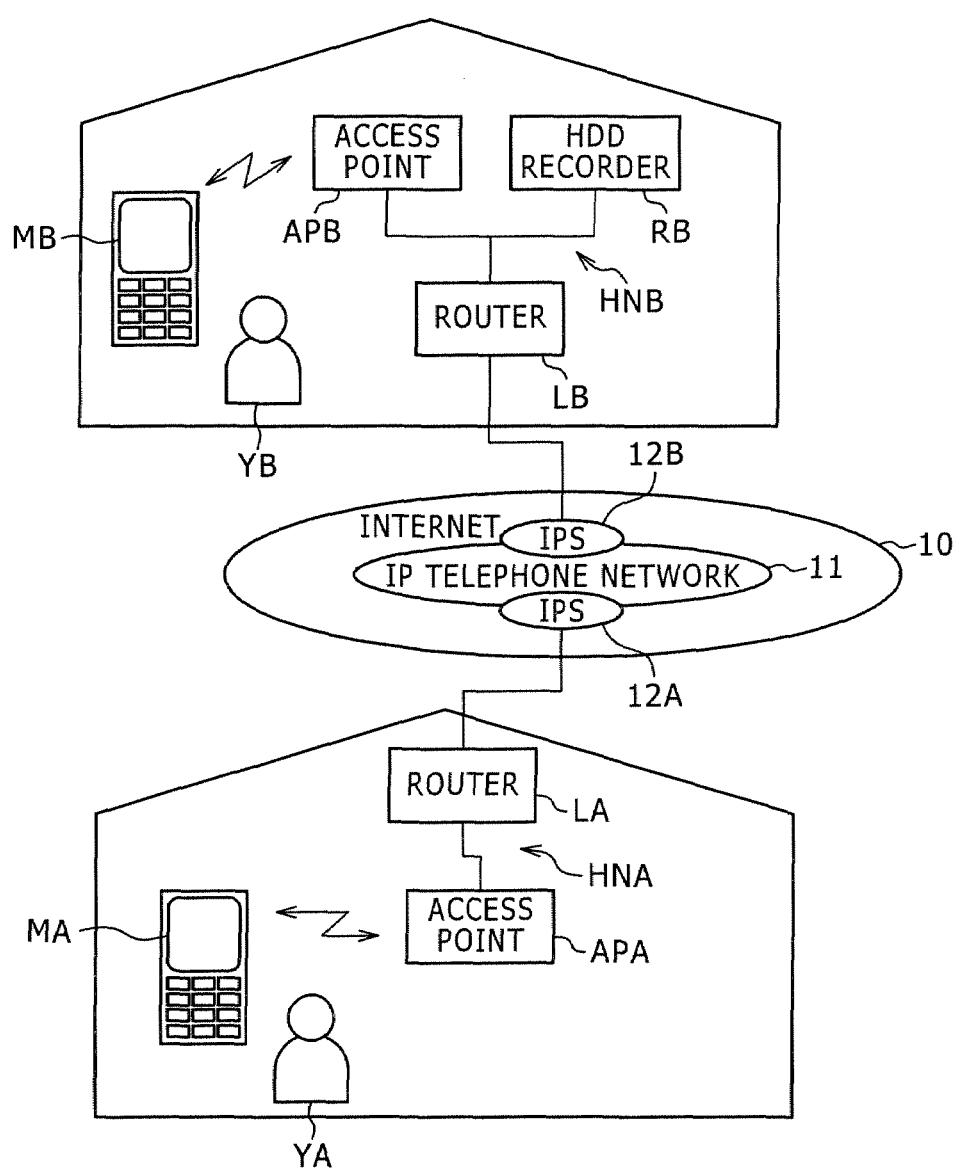
FIG. 1 is a concept diagram of a communication system of an embodiment of the present invention.

Hereinafter, referring to the drawings, one embodiment of a communication terminal and a communication system of the present invention is described.

While in the present embodiment, as one example of the communication terminals of the present invention, a mobile telephone terminal is taken, and as one example of the communication system, a home network system is taken, of course, the contents described herein are only examples, and it goes without saying that the present invention is not limited to these examples.

[Schematic Configuration of System and Outline of Functions that Apparatuses Have]

FIG. 1 shows a schematic configuration of the communication system of the embodiment of the present invention.

In FIG. 1, a home network HNA is constructed at the home of a user YA, and similarly, a home network HNB is also constructed at the home of a user YB. The home network HNA on the side of the user YA has a router LA, and an access point APA for wireless LAN (Local Area Network). Similarly, the home network HNB on the side of the user YB has a router LB, an access point APB, and an HDD (hard disk drive) recorder RB as one example of another apparatus within the home network HNB.

A mobile telephone terminal MA of the user YA is equipped with at least a wireless LAN function and an IP (Internet Protocol) telephone function, in addition to functions that a general mobile telephone terminal is equipped with.

Similarly, a mobile telephone terminal MB of the user YB is equipped with the wireless LAN function and the IP telephone function, in addition to the functions that a general mobile telephone terminal is equipped with.

The access point APA of the home network HNA is an access point of the wireless LAN, which is connected to the router LA. In the case of the present embodiment, the access point APA is capable of wireless LAN connection to the mobile telephone terminal MA of the user YA.

Similarly, the access point APB of the home network HNB is an access point of the wireless LAN, which is connected to the router LB. In the case of the present embodiment, the access point APB is capable of wireless LAN connection to the mobile telephone terminal MB of the user YB.

The HDD recorder RB of the home network HNB is equipped with a connecting terminal for connecting to the router LB, in addition to a TV broadcasting receiving tuner, an HDD, and external input/output terminals of video and audio signals, which a general HDD recorder is equipped with. Moreover, in the HDD recorder RB, an access right for the mobile telephone terminal MB of the user YB to perform various settings and operations of the HDD recorder RB via a network is set. That is, in the HDD recorder RB of the home network HNB, fundamentally, the access right is set only with respect to, e.g., an IP address or the like of the mobile telephone terminal MB existing within the same segment.

The router LA of the home network HNA is equipped with a function of connecting the respective apparatuses within the home network HNA (that is, within the home network of the same segment) and a function of connecting to the internet 10 through an internet service provider 12A that the user YA subscribes to, as needed. Moreover, in the router LA, an access right for the mobile telephone terminal MA of the user YA to perform various settings and the like of the router LA via the network is set. That is, in the router LA of the home network HNA, fundamentally, the access right is set only with respect to, e.g., an IP address or the like of the mobile telephone terminal MA existing within the same segment.

Similarly, the router LB of the home network HNB is equipped with a function of connecting the respective apparatuses within the home network HNB (within the home network of the same segment) and a function of connecting to the internet 10 through an internet service provider 12B that the user YB subscribes to, as needed. Moreover, in the router LB, an access right for the mobile telephone terminal MB of the user YB to perform various settings and the like of the router LB via the network is set. That is, in the router LB of the home network HNB, fundamentally, the access right is set only with respect to, e.g., the IP address and the like of the mobile telephone terminal MB existing within the same segment.

As described above, in the home network HNA of the present embodiment, the access point APA is connected to the router LA, the router LA is connectable to the internet 10, and further the mobile telephone terminal MA is connectable to the router LA through the access point APA. The mobile telephone terminal MA can be connected to the internet service provider 12A through the access point APA and the router LA, thereby enabling a telephone call and data transmission and reception, e.g., via an IP telephone network 11 within the internet 10 to be performed.

Similarly, in the home network HNB of the present embodiment, the access point APB is connected to the router LB, and the router LB is connectable to the internet 10. Further, the mobile telephone terminal MB is connectable to the router LB through the access point APB, so that the mobile telephone terminal MB can be connected to the internet service provider 12B through the access point APB and the router LB, thereby enabling a telephone call and data transmission and reception, e.g., via the IP telephone network 11 within the internet 10 to be performed.

Moreover, since in the respective apparatuses within the home network HNA, only the access right for the mobile telephone terminal MA is set, the mobile telephone terminal MA enables the setting and operation of the respective apparatuses within the home network HNA.

Similarly, since in the respective apparatuses within the home network HNB, only the access right for the mobile telephone terminal MB is set, the mobile telephone terminal MB enables the setting and operation of the respective apparatuses within the home network HNB.

[Access Permission Setting Via External Network]

Hereinafter, for example, various types of setting processing in the case where the mobile telephone terminal MA of the user YA sets and operates the HDD recorder RB within the home network HNB on the side of the user YB via the internet 10 are described.

The router LB on the side of the home network HNB is capable of setting of permission/prohibition to network access from the mobile telephone terminal MA, and is equipped with a function of sending information of its own ability (hereinafter, denoted as apparatus ability information), e.g., as to whether or not the access setting is enabled via the network and the like.

The HDD recorder RB of the home network HNB is capable of setting of permission/prohibition to network access from the mobile telephone terminal MA, and is equipped with a function of sending information of its own ability (apparatus ability information), e.g., as to whether or not the access setting is enabled via the network, various setting operations such as reception channel setting and video recording reservation setting are enabled via the network and so on, and a function of outputting temporary key (that is, authentication key) information for enabling the mobile telephone terminal MA to temporarily operate and set the HDD recorder RB when the permission of the network access is given to the mobile telephone terminal MA.

Moreover, when a voice call channel is established between the mobile telephone terminal MB and the mobile telephone terminal MA, and if the user YB performs predetermined operation for enabling the mobile telephone terminal MA to access the apparatus within its own home network HNB, the mobile telephone terminal MB is equipped with a function of presenting the user YB a list of object apparatuses that the mobile telephone terminal MA can access via the external network among the respective apparatuses within the home network HNB, a function of changing and controlling setting values of the object apparatus that the user YB has selected from the list of the object apparatuses (in this example, the HDD recorder RB) and the router LB to values enabling the mobile telephone terminal MA to access them via the external network, and a function of transmitting, to the other mobile telephone terminal MA, information for enabling the other mobile telephone terminal MA to temporarily access the HDD recorder RB via the network (hereinafter, referred to as temporary access information). The temporary access information is composed of an end point (IP address, port number), and the temporary key information of the HDD recorder RB.

On the other hand, upon receiving the temporary access information transmitted from the terminal MB when the voice call channel is established to the mobile telephone terminal MB, the mobile telephone terminal MA utilizes the IP address, port number, and temporary key information included in the temporary access information to access the home network HNB via the internet 10. This allows the mobile telephone terminal MA to set or operate the HDD recorder RB.

While in the present embodiment, the functions of the mobile telephone terminal MA and the mobile telephone terminal MB are described separately, of course, the mobile telephone terminal MA may be equipped with the same functions as those of the mobile telephone terminal MB, and the mobile telephone terminal MB may be equipped with the same functions as those of the mobile telephone terminal MA.

[Flow at Access Time Via External Network]

Hereinafter, in the communication system of the embodiment of the present invention, a flow in which the user YA sets, e.g., video recording setting of the HDD recoder RB of the home network HNB on the side of the user YB and the like using the mobile telephone terminal MA is described using a sequence diagram shown in FIG. 2, a screen transition example of the mobile telephone terminal MB shown in FIG. 3 (screens V11 to V16), and a screen transition example of the mobile telephone terminal MA shown in FIG. 4 (screens V1 to V6).

Figure 2:
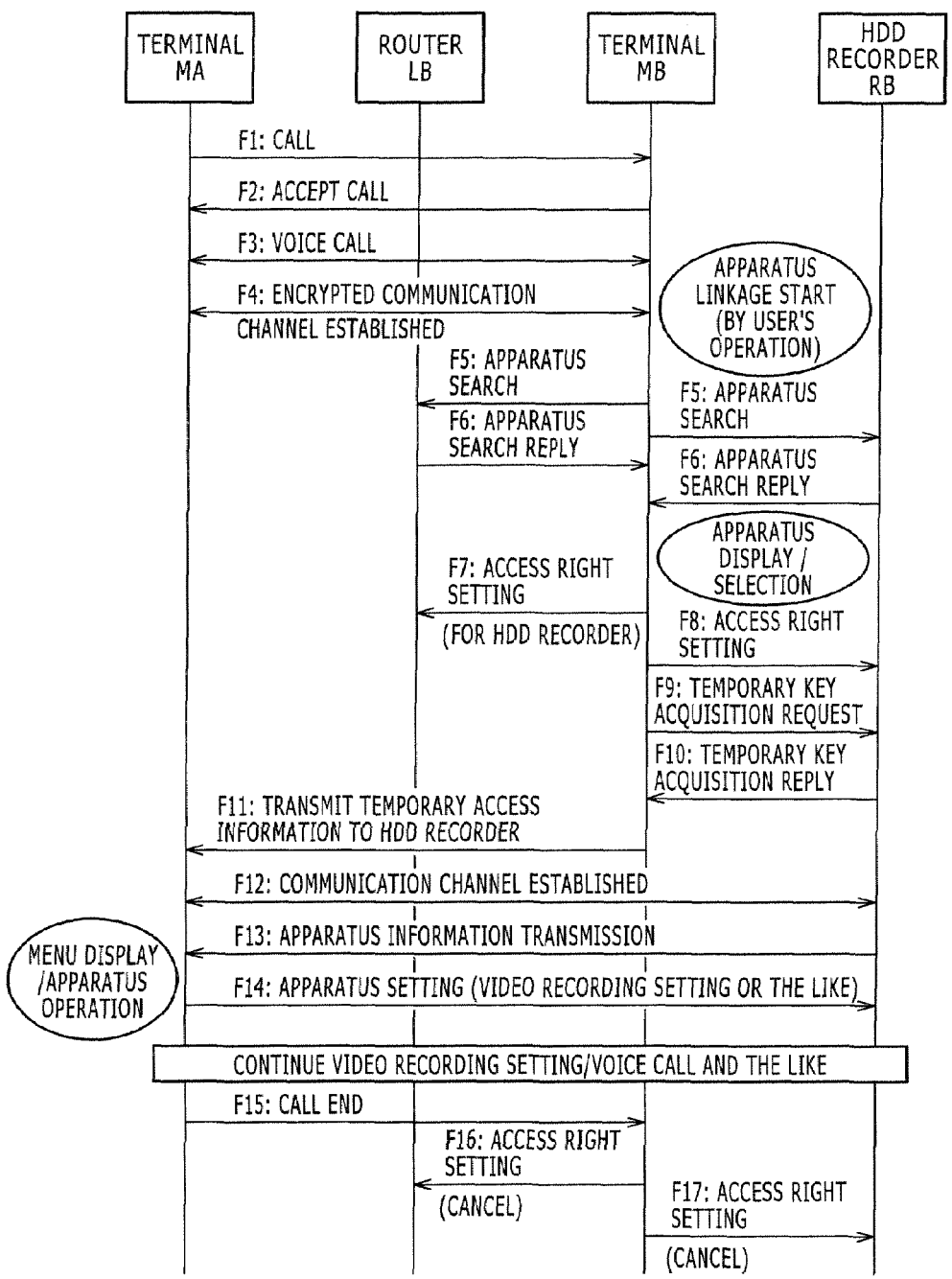
FIG. 2 is a sequence diagram showing a flow in which a user YA performs, e.g., video recording setting of an HDD recorder RB in a home network HNB on the side of a user YB, and the like, using a mobile telephone terminal MA.

In FIG. 2, in step F1, a call is first made from the mobile telephone terminal MA to the mobile telephone terminal MB via the IP telephone network 11, and subsequently, in step F2, call acceptance is performed from the mobile telephone terminal MB to the mobile telephone terminal MA, by which in step F3, a voice call channel by the IP telephone network 11 is established between the mobile telephone terminal MA and the mobile telephone terminal MB. Further, as needed, in step F4, an encrypted communication channel is established between the mobile telephone terminal MA and the mobile telephone terminal MB. While the communication channel is being established in step F3 (or in step F4), it is indicated on a display of the mobile telephone terminal MB that the communication channel to the counterpart terminal (terminal MA) is being established and the like as shown on the screen V11, and similarly, it is indicated on a display of the mobile telephone terminal MA that the communication channel to the mobile telephone terminal MB is being established and the like as shown on the screen V1. Moreover, although the encrypted communication channel is not requisite, for example, when the security performance of the communication performed between the mobile telephone terminal MA and the mobile telephone terminal MB needs to be kept as in the case where the above-described communication of the temporary key (authentication key) is performed, it is desirable that the encrypted communication channel be established as in step F4.

Figure 3:
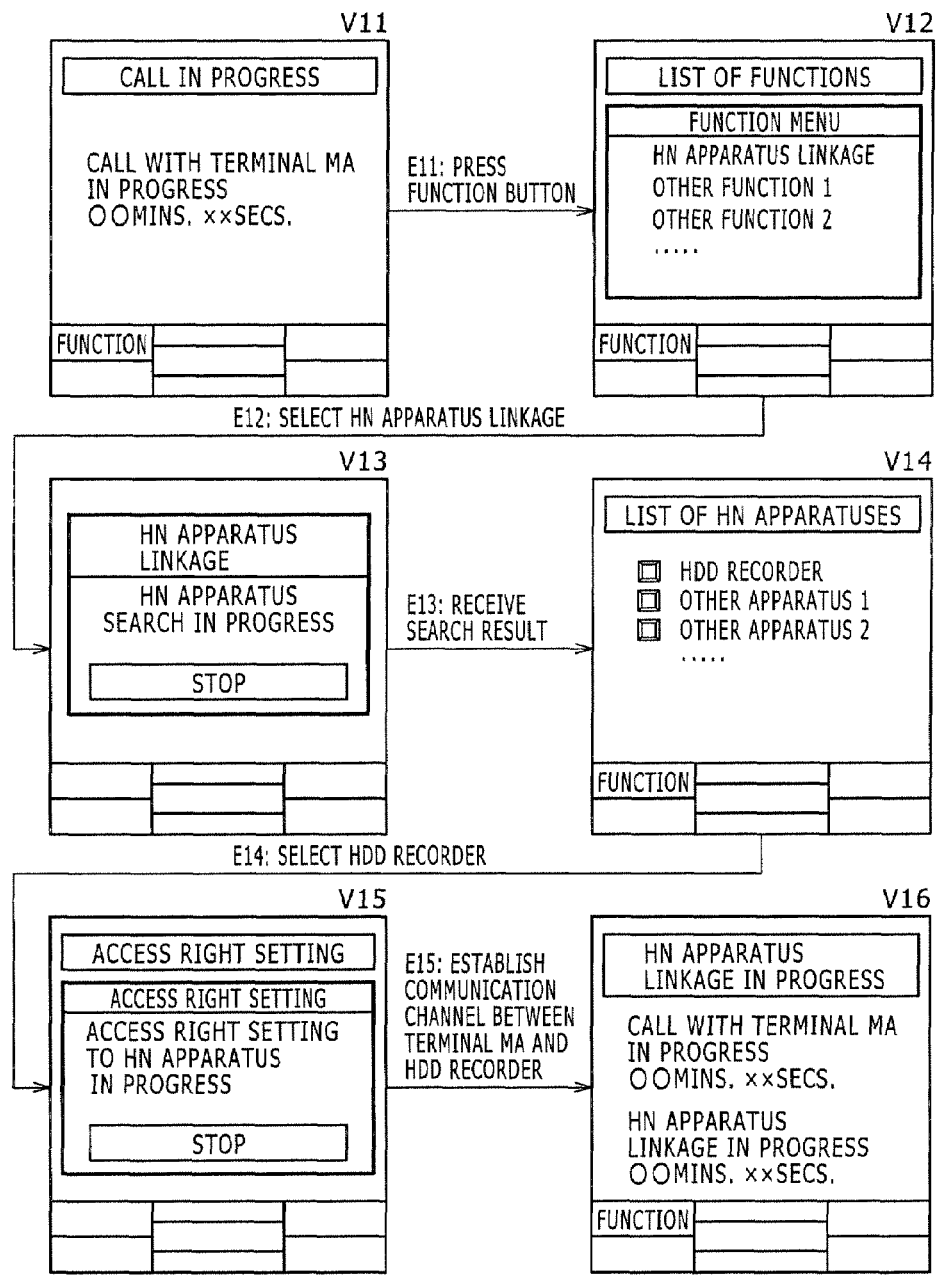
FIG. 3 is a diagram showing a transition example of a screen indicated on a display of a mobile telephone terminal MB as the processing shown in the sequence diagram of FIG. 2 is being executed.

Next, as shown in E11 of FIG. 3, if a predetermined button operation (for example, operation of pressing a "function key" or the like) is performed by the user YB, the mobile telephone terminal MB displays a function list menu of the relevant terminal, as shown on the screen V12. If a home network (HN) apparatus linkage menu is selected by the user YB from the screen V12 (E12 of FIG. 3) through the cursor operation, the mobile telephone terminal MB activates a home network apparatus linkage function for linking to the apparatuses within its own home network HNB, and connects to the home network HNB through the access point APB as step F5 to start search of the apparatuses connected within the home network HNB (apparatus search). At this time, the mobile telephone terminal MB also indicates, on the display, that the search is in progress as shown on the screen V13.

Once the apparatus search is performed by the mobile telephone terminal MB, as step F6, the router LB and the HDD recorder RB, which are the respective apparatuses within the home network HNB, reply their own presence within the home network HNB, and the above-described apparatus ability information in the respective apparatuses to the mobile telephone terminal MB. Upon receiving the replies from the respective apparatuses (E13 of FIG. 3), the terminal telephone terminal MB finds object apparatuses that the mobile telephone terminal MA can access via the external network, and indicates a list of the object apparatuses on the display as shown on the screen V14.

Next, if a desired object apparatus (in this example, the HDD recorder RB) is selected by the user YB from the screen V14 through cursor operation (E14 of FIG. 3), the mobile telephone terminal MB changes the setting value of the router LB so that the HDD recorder RB can be accessed via the external network as step F7, and also changes the setting value of the HDD recorder RB so that it can be accessed via the external network as step F8. Moreover, the mobile telephone terminal MB requests the temporary key information from the HDD recorder RB as step F9. During the change of the setting values, the mobile telephone terminal MB indicates that setting change is in progress on the display, as shown on the screen V15.

Subsequently, upon acquiring the temporary key information from the HDD recorder RB in step F10, as step F11, the mobile telephone terminal MB transmits, to the mobile telephone terminal MA via the IP telephone network 11, the above-described temporary access information for enabling the mobile telephone terminal MA to temporarily access the HDD recorder RB via the network.

Figure 4:
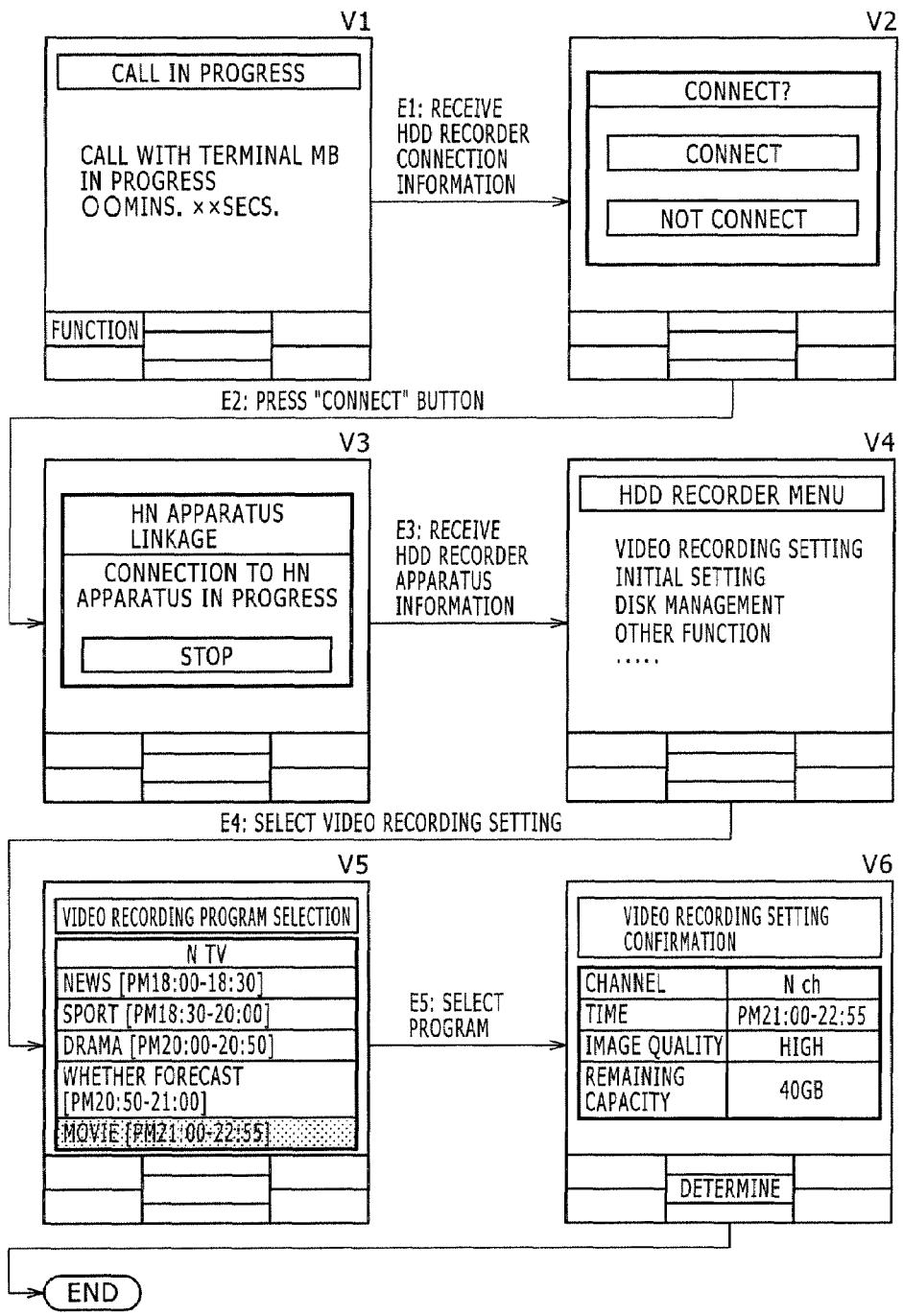
FIG. 4 is a diagram showing a transition example of a screen indicated on a display of the mobile telephone terminal MA as the processing shown in the sequence diagram of FIG. 2 is being executed.

The mobile telephone terminal MA, which has received the temporary access information to the HDD recorder RB (E1 of FIG. 4), shows indication as shown on the screen V2 of FIG. 4 in order to ask the user YA whether or not to connect to the home network HNB via the internet or the like. If the user YA selects "connect" from the screen V2 (E2 of FIG. 4), the mobile telephone terminal MA establishes the communication channel to the HDD recorder RB utilizing the temporary access information which has already been received as step F12. During the communication with the HDD recorder RB, the mobile telephone terminal MA indicates information showing that the connection is in progress on the display, as shown on the screen V3 of FIG. 4.

Subsequently, as step F13, the mobile telephone terminal MA receives the apparatus information indicating a current state of the apparatus (for example, the information of whether or not an instruction regarding "video recording setting" can be accepted or the like) from the HDD recorder RB. Moreover, based on the received apparatus information, the mobile telephone terminal MA displays a menu for user interface in setting or operating the HDD recorder RB on the display, as shown on the screen V4. For example, if selection operation of a video recording setting menu is performed by the user YA from the screen V4, e.g., through the cursor operation (E4 of FIG. 4), the mobile telephone terminal MA displays a setting screen for performing the video recording of, e.g., a television program in the HDD recorder RB, as shown on the screen V5.

Subsequently, if the user YA selects a video recording program or the like utilizing the video recording setting screen (E5 of FIG. 4), the mobile telephone terminal MA displays a selection state or the like of the video recording program performed by the user YA. Once the user YA presses, a determination key or the like to thereby determine a setting content of the program video recording, as step F14, the mobile telephone terminal MA transmits the setting information of the program video recording selected and so on by the user YA to the HDD recorder RB. Thus, in the HDD recorder RB, the video-recording setting is performed.

Thereafter, the user YA performs operation of pressing a call-end button in the mobile telephone terminal MA to end the voice call between the mobile telephone terminal MA and the mobile telephone terminal MB, and when the voice call channel is cut off as step F15, as steps F16 and F17, the mobile telephone terminal MB cancels the settings for the router LB and the HDD recorder RB performed in the previous steps F7 and F8. This brings the settings of the router LB and the HDD recorder RB in the home network HNB into external-access prohibiting setting (returns them to a secure state), and thus, the mobile telephone terminal MA is disabled to access the home network HNB.

While in the foregoing, the example in which the mobile telephone terminal MB returns the home network HNB to the access disabled setting state in accordance with the call end, is taken, for example, time counting starts at a point when the access permitting setting via the network is made, and when the time counting value reaches a predetermined time-up counting value, the home network HNB may be returned to the access disabled setting state.

[Internal Configuration of Mobile Telephone Terminal]

Figure 5:
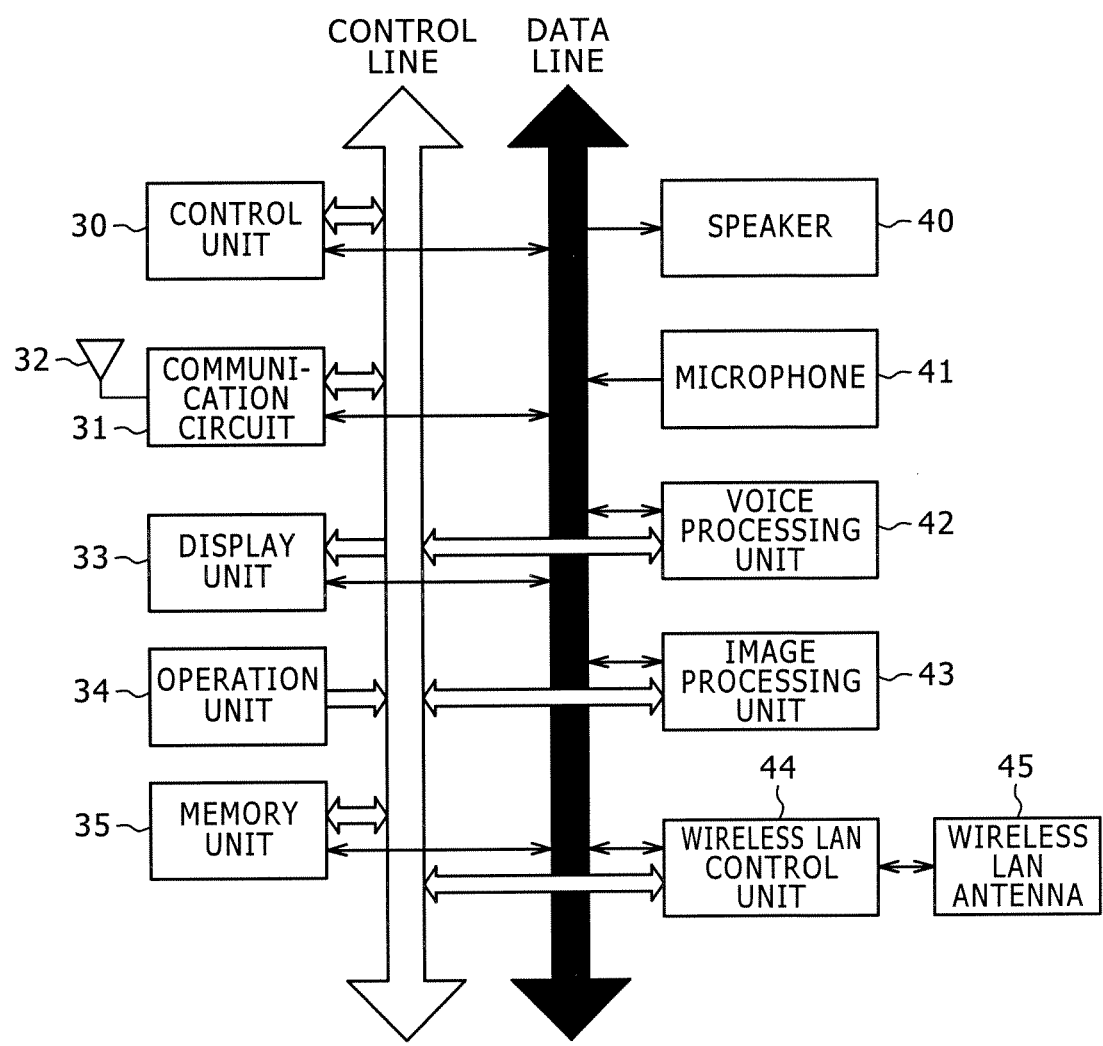
FIG. 5 is a block diagram showing a schematic internal configuration of the mobile telephone terminal of the embodiment of the present invention.

FIG. 5 shows a schematic internal circuit configuration of the mobile telephone terminal of the present embodiment equipped with the functions of the above-described mobile telephone terminals MA, MB.

In FIG. 5, a data line is a transmission line for transmitting various types of data such as voice data, electronic mail data, and image data. The control line is a transmission line for transmitting various types of control information such as control data from a control unit 30 composed of a CPU (central processing unit).

An antenna 32 is an antenna for performing transmission and reception of signal wave s with respect to a base station of the mobile telephone network, and is connected to a communication circuit 31. The communication circuit 31 performs frequency conversion, modulation and demodulation, and the like of the transmitted and received signals.

A wireless LAN control unit 44 and a wireless LAN antenna 45 are devices for the mobile telephone terminal of the present embodiment to perform the wireless LAN communication. For example, the mobile telephone terminal of the present embodiment accesses, e.g., the access point within the above-described home network through these wireless LAN control unit 44 and the wireless LAN antenna 45 to thereby connect to the various apparatuses within the relevant home work network, and be enabled to be connected to the internet 10 and the like as needed. Moreover, in the case of the mobile telephone terminal of the present embodiment, as described above, the connection to the internet 10 via the wireless LAN also enables the connection to the IP telephone network 11.

The call voice data received by the antenna 32 and the communication circuit 31, and the call voice data obtained from the IP telephone terminal via the wireless LAN are sent to a voice processing unit 42, and other received data is sent to the control unit 30 to be properly processed, and then, is sent from the control unit 30 to the respective units as needed. As the received data other than the call voice, electronic mail data, image data of a moving image and a still image, data of music and the like, HTML (Hyper Text Markup Language) data, data of a program code and the like can be exemplified.

The voice processing unit 42, when the call voice data is supplied, decodes the relevant call voice data, converts the call voice data after decoding to an analog voice signal, and sends the analog voice signal to a speaker 40 or an earphone jack not shown.

The speaker 40 is incorporated into a terminal body, and after the supplied analog voice signal is amplified by an internal amplifier, the voice signal is converted into an audible signal to be output outside. This allows the call voice to be outputted from the speaker 40.

A microphone 41 is incorporated into the terminal body, and converts an inputted voice into an analog voice signal and amplifies it by an internal amplifier, and further sends the analog voice signal to the voice processing unit 42.

The voice processing unit 42, when the call voice signal is supplied from the microphone 41, converts the call voice signal into digital voice data and then encodes it, and further sends the call voice data after encoding to the communication circuit 31 or the wireless LAN control unit 44. This enables the transmission of the voice signal utilizing the mobile telephone network, and the transmission of the voice signal utilizing the IP telephone network 11.

A display unit 33 is composed of, e.g., a liquid crystal display or the like and a display driving circuit for driving the liquid crystal display. The display driving circuit drives the liquid crystal display based on a display signal supplied from the control unit 30 or an image signal supplied from an image processing unit 43. This allows an image or letters and the like to appear on the display.

An operation unit 34 is composed of operators such as a ten keypad (numeric key board), a power supply button, call-start/call-end buttons, and arrow keys, and an operation signal generator that generates an operation signal according to the operation of the operators. By operating this operation unit 34, the user performs outgoing and incoming calls, creation of an electronic mail text, transmission and reception of an electronic mail, connection to the internet, and as described above, start instruction of the apparatus linkage, apparatus selection within the home network, and instruction operation such as apparatus operation and apparatus setting via the network.

The image processing unit 43 expansion-decodes compression-encoded image data that is read from an embedded memory under the control of the control unit 30, image data and the like that are acquired via the internet or the like, and so on, and sends the image data after the expansion decoding to the display unit 33 via the data line. Also, the image processing unit 43 performs compression-encoding and the like of data of a still image or moving image photographed by a camera unit not shown, and sends the compression-encoded image data to the embedded memory under the control by the control unit 30 to store it.

A memory unit 35 includes a ROM (Read Only Memory) and a RAM (Random Access Memory). The ROM stores an OS (Operating System), control program code for the control unit 30 to control the respective units, various initial setting values, font data, dictionary data, various sound data such as ring alert and key operation sound, and according to the present embodiment as described above, program codes for performing access control to the home network or the like, setting and control of the respective apparatuses within the home network, operation and setting of the respective apparatuses via the network, and display screen control and the like in accordance with the foregoing, and further, other program codes for various applications installed in the relevant terminal, apparatus identification information (ID) of the relevant terminal and so on. This ROM includes a writable ROM such as an NAND type flash memory and an EEPROM (Electrically Erasable Programmable Read-Only Memory), and is also enabled to store electric mail data, data of a telephone book and an electronic mail address book, data of a schedule book, various types of data regarding the communication such as communication history and communication fee, dictionary data, still picture and moving data, sound data for key operation sound and alarm sound, other various user setting values, and the like. The RAM stores data as a working area when the control unit 30 performs various types of data processing, as needed.

The control unit 30 is made of a CPU, and based on the OS and various programs stored in the memory unit 35, performs various types of control of the relevant terminal, and according to the present embodiment as described above, the access control to the home network and the like, setting and control of the respective apparatuses within the home network, operation and setting of the respective apparatuses via the network, and the display screen control and the like in accordance with the foregoing.

Additionally, although being omitted in FIG. 5, the terminal of the present embodiment is also equipped with components that a general mobile telephone terminal has, such as a digital camera unit, an external memory interface, a connector for external cable, an infrared communication function, an electric wallet function, a battery, a power control function, an LED (light-emitting diode) unit, a vibrator and the like.

As described above, according to the mobile telephone terminal and the communication system of the embodiment of the present invention, when the voice call channel is established between the mobile telephone terminal MA and the mobile telephone terminal MB, the user YA and the user YB of these mobile telephone terminals are considered to have a reliable relationship therebetween, and the mobile telephone terminal MA and the mobile telephone terminal MB used by the user YA and the user YB are regarded as reliable, so that, for example, by temporarily granting, to the mobile telephone terminal MA of the user YA, the access right similar to that granted to the mobile telephone terminal MB with respect to the respective apparatuses within the home network HNB of the user YB, the user YB does not need to perform the complex setting operation for himself or herself for allowing the respective apparatuses within the home network HNB to be accessed via the external network, and the user YA is allowed to set or operate the respective apparatuses within the home network HNB of the user YB using the mobile telephone terminal MA. That is, according to the embodiment of the present invention, since the access permission/prohibition, stopping, and the like via the network are performed according to the presence or absence of the establishment of the voice call channel, the user does not need to perform any special operation for accessing via the network. Moreover, according to the present embodiment, only when the voice call channel is established and the user grants permission, the access via the network is enabled, and on the other hand, the access is disabled when the voice call channel is cut off, which can prevent unintended external access for the user when the voice call is not in progress, and thus, eliminates the need for conventional complex security setting in the router and the like.

Accordingly, according to the present embodiment, for example, a father or mother who cannot make video recording setting of the HDD recorder or the like calls a mobile telephone terminal of his or her child living in a distant place and performs the simple operation, which allows the access right to the HDD recorder in the house of the father or mother to be granted to the mobile telephone terminal of the child, thereby having the child perform the video recording setting. Of course, this is not limited to the HDD recorder, but in the case where setting of a personal computer or setting of a printer is performed, the similar processing is enabled. Moreover, according to the present embodiment, a user having trouble with a personal computer at home or the like calls, e.g., a customer center, to grant an access right to the personal computer from a terminal of a personnel in charge in the customer center under an agreement of the user, so that support such as setting or troubleshooting of the relevant personal computer from the terminal of the customer center can be realized safely and easily.

Moreover, the communication system of the present embodiment can be realized by the mobile telephone terminals and the home network, and thus, a large-scaled and complex system as in the related art is not necessary.

The above description of the embodiment is only one example of the present invention. It is, therefore, obvious that the present invention is not limited to the above-described embodiment, but various modifications can be made according to designs and the like within the scope not departing from the technical concept according to the present invention.

The communication terminal according to the present invention is not limited to the above-described mobile telephone terminal, but the present invention can be applied to various mobile terminals such as PDA (Personal Digital Assistants), a car navigation apparatus, and a mobile AV apparatus that are equipped with the communication function. Moreover, the network according to the communication system of the present invention is not limited to the home network system, but the present invention can be applied to other various networks.

The present invention contains subject mater related to Japanese Patent Application No. JP2006-107401 filed in the Japanese Patent Office on Apr. 10, 2006, the entire contents of which being incorporated herein by reference.

What is claimed is:

1. A communication terminal comprising:
  a first communication unit that performs communication including establishing at least a voice call with a remote communication terminal that is located remotely from the first communication unit;
  an operation input unit that acquires input from a user;
  a second communication unit that performs communication with an electronic device, connected to a local area network, that implements a function that is controlled when the electronic device is accessed via at least an external network to which the remote communication terminal is connected; and
  a control unit that, when an access permission instruction is inputted by the user via said operation input unit during a time period in which the voice call is in a connected state, performs, during the time period, setting with respect to the electronic device to permit the remote communication terminal and said first communication unit to access the electronic device, at least one of said remote communication terminal and said first communication unit accessing the electronic device via the external network, and transmits, during the time period, to the remote communication terminal via the first communication unit, access information for performing the access to the electronic device, via the external network, wherein said control unit performs setting with respect to the electronic device to prohibit the access via said external network, when the voice call is disconnected, and wherein said control unit, when performing the setting with respect to the remote communication terminal to permit the access via said external network, requests authentication key information for temporarily permitting the access via said external network from said the remote communication terminal, and causes the authentication key information acquired from the electronic device to be included in said access information.

2. The communication terminal according to claim 1, wherein said control unit transmits said access information of the electronic device within the local area network to the remote communication terminal via the first communication unit.

3. The communication terminal according to claim 2, further comprising a display unit equipped with a screen, wherein said control unit searches a plurality of electronic devices connected to the local area network via said second communication unit, displays a list of electronic devices obtained from the search on the screen of said display unit, performs setting according to the access permission instruction, via the external network with respect to the electronic device which the user has selected from the list of the plurality of electronic devices displayed on said screen via said operation input unit, and further, transmits said access information of the electronic device to the remote communication terminal via said first communication unit.

4. The communication terminal according to claim 1, wherein said first communication unit performs encrypted communication.

5. The communication terminal according to claim 1, further comprising a display unit that displays a plurality of electronic devices, including the electronic device, each of said plurality of electronic devices being selectable to be linked to the remote communication terminal.

6. The communication terminal according to claim 5, wherein each of said plurality of electronic devices are located in the local area network.

7. The communication terminal according to claim 6, wherein the local area network is distinct from the external network.

8. The communication terminal according to claim 5, wherein said display unit displays a progress of the voice call with a progress of linking the electronic device, that is selected from among said plurality of electronic devices, to the remote communication terminal.

9. The communication terminal according to claim 1, further comprising a display unit that displays a plurality of functions, each of said plurality of functions being selectable to be performed with respect to the electronic device.

10. The communication terminal according to claim 1, wherein the first communication unit is proximate to the local area network.

11. The communication terminal according to claim 1, wherein the local area network is a home-based network.

12. The communication terminal according to claim 1, wherein the remote communication terminal is a mobile telephone.

13. The communication terminal according to claim 1, wherein the communication terminal is a mobile telephone.

14. A communication system comprising:
a local communication terminal connected to a local area network that, when an access permission instruction is inputted by a user of the local communication terminal, during a time period in which a voice call is in a connected state, the voice call having been established between the local communication terminal and a remote communication terminal connected to an external network, performs, during the time period, setting to permit access from the remote communication terminal, to an electronic device connected to the local area network via the external network, and further transmits, during the time period, to the remote communication terminal, access information for accessing the electronic device via the external network;
the remote communication terminal that accesses the electronic device via the external network utilizing the access information transmitted from said first communication terminal during the time period,
wherein, when at least said voice call is disconnected, said local communication terminal performs setting with respect to the electronic device to prohibit the access via said external network, and
wherein said local communication terminal, when performing the setting with respect to the electronic device to permit the access via said external network, requests authentication key information from the electronic device for temporarily permitting the access via said external network, and causes the authentication key information acquired from the electronic device to be included in said access information.

15. The communication system according to claim 14, wherein said local communication terminal communicates with the electronic device connected to the local area network, and transmits said access information of the electronic device to the remote communication terminal.

16. The communication system according to claim 15, wherein said local communication terminal searches a plurality of electronic devices connected to the local area network, screen-displays a list of electronic devices obtained from the search in a screen, and performs access permission setting via said external network with respect to the electronic device, which the user has selected from the screen-displayed list of electronic devices, and further transmits said access information of the electronic device to the remote communication terminal.

17. The communication system according to claim 14, wherein, the remote communication terminal acquires apparatus information indicating a function operable during the time period, and based on the acquired apparatus information, displays an operation screen for the user to operate the electronic device, and further performs operation control of the electronic device in accordance with an operation instruction inputted by the user.

18. The communication system according to claim 14, wherein said local communication terminal and the remote communication terminal each perform encrypted communication.

* * * * *